UNITED STATES PATENT OFFICE.

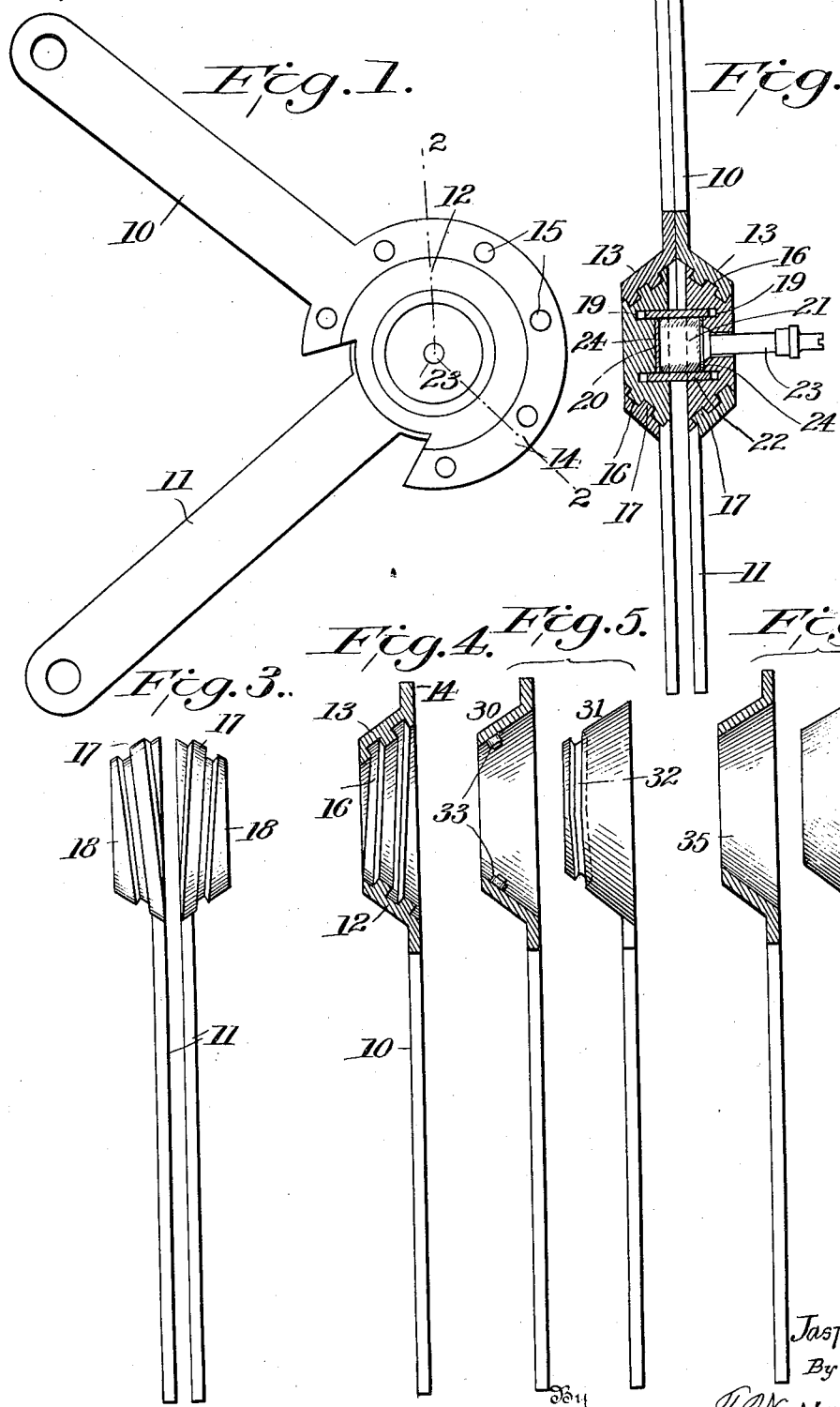

JASPER A. McCASKELL, OF SALT LAKE CITY, UTAH.

SHOCK-ABSORBER.

1,301,067.     Specification of Letters Patent.     Patented Apr. 15, 1919.

Application filed September 14, 1917.   Serial No. 191,433.

*To all whom it may concern:*

Be it known that I, JASPER A. McCASKELL, a citizen of the United States, residing at Salt Lake City, in the county of Salt Lake and State of Utah, have invented certain new and useful Improvements in Shock-Absorbers, of which the following is a specification.

This invention relates to devices for opposing resilient resistance to the movement of bodies due to their own inertia. In other words, the invention relates to a means for retarding or modifying the action of vehicle springs and the same has for its object more particularly to provide a shock-absorber for motor-vehicles in which the retarding action exerted by the shock-absorber greatly increases as the distance between the axle and the vehicle becomes greater or less due to the expanding or contracting action of the vehicle spring.

More specifically, the present invention has relation to that type of shock-absorber which comprises a pair of pivotally-connected arms, one of which arms is connected to the vehicle body or to a spring member and the other to the vehicle spring, and an elastic cushion and compression means at the junction of the arms, as I will hereinafter describe and claim.

In the accompanying drawings forming part of this specification and in which similar reference characters indicate like parts in the several views;

Figure 1 is a side elevation of a shock-absorber embodying my invention.

Fig. 2 is a sectional view of the same substantially on the line 2—2 of Fig. 1.

Fig. 3 is a side elevation of a duplex lever-arm and the conical or tapering pressure-blocks fixed thereto.

Fig. 4 is a sectional view of the lever arm 10, detached.

Figs. 5 and 6 are modifications, which I will hereinafter describe.

In carrying out my invention I employ a pair of lever arms, 10 and 11, the former of which is adapted to be connected in some appropriate manner to the vehicle body, while the arm, 11, is duplex in character and formed of two similar and parallel members the ends of which are designed to be appropriately secured to the vehicle spring, this connection of the two arms being not essentially unlike the similar mode of attaching other shock-absorbers of this general character, but it will be apparent that the outer or free ends of the arms, 10 and 11, may be connected respectively to the upper and lower members of an elliptical or other spring of the vehicle, without departing from the salient features of the invention.

The lever arm, 10, has its inner end formed or provided with a casing, 12, which may be cylindrical but is shown in the form of oppositely extending truncated cones, or tapering portions, 13, said casing having also a peripheral flange, 14. The casing and its arm may be divided into similar sections, as indicated in the drawing and when this is done the two parts of the casing will be securely fastened together by means of bolts, 15, or other securing devices.

The interior of each of the conical or tapering portions, 13, of the casing is provided with a spiral groove, 16, the groove in one of the conical or tapering portions running to the right and the groove in the other conical or tapering portion running to the left, thereby forming right-and-left threads upon opposite sides of the central line and annularly about the intereior of the casing. These grooves are designed to be engaged by corresponding ribs or threads, 17, formed on the outer surfaces of conical or tapering heads, 18, rigidly fixed to or formed on the inner end of the duplex lever arm, 11, the members of this arm being separate from each other and being in parallelism and each carrying its own conical or tapering block or head. The inner faces of these heads are formed with annular grooves, 19, and said faces are also recessed to form a chamber, 20, in which is designed to be located a rubber tube or cushion, 21, which is contained inside of a metal sleeve or tube, 22, open at both ends and said ends being fitted in the annular grooves, 19, in said heads or tapered blocks.

The rubber tube or cushion is sealed at both ends and is preferably of an inflatable character, hence there is connected with it a tube, 23, which may correspond somewhat to the ordinary tire-inflating tube and through which air may be admitted to the interior of the rubber tube or cushion. If desired, a steel washer or composition wear plate, 24, may fit over the inflatable tube to thereby protect the same from excessive wear or injury due to the compression of the tube by inward movement of the conical blocks or heads.

In operation, the arms, 10 and 11, are connected respectively to the upper and lower springs of a vehicle, or to one of said springs and the vehicle body, as desired, and as the springs are forced closer or farther apart, the levers are drawn closely together or farther apart as the case may be. As these arms or levers move together, the cylindrical or tapered blocks, 18, with which they are connected are caused by the engagement of their threaded exterior with the spiral grooves on the interior of the casing, 12, to move inwardly toward each other and against the pneumatic tube, 23, whereby the friction against the blocks is gradually increased, the extent of friction depending upon the pressure to which the tube, 23, has been inflated. In other words, the pressure against the inner face of the conical blocks or heads is in direct ratio to the amount of friction produced when the arms, 10 and 11, are moved respectively to or from each other.

The construction is such that on the compression of the vehicle spring to which the device is attached, the friction takes place between the blocks, 18, and the outer casing. Preferably the groove in the inner block is enlarged so that the rib or tooth on the casing does not come in actual contact with the groove on the block during the compression of the springs. On the recoil of the springs, the friction takes place between the blocks and the pneumatic tube, and hence on the rebound of the spring the inflatable tube will gradually absorb the shock and relieve the supporting spring of the vehicle from undue shock or strain when obstacles or ruts in the road are traversed, to permit rough roads to be passed over at high speed and to greatly reduce the rebound and oscillation of the vehicle and consequently give increased ease and comfort to the occupant of the vehicle.

In Fig. 5, I illustrate a modified form of shock absorber wherein the casing, 30, has its interior devoid of threads, and the exterior of the conical or tapering block or head, 31, is provided with a cam-groove, 32, adapted to be engaged by small rollers, 33, on the inner surface of the cylindrical, conical or tapering portion of the casing. This has the same effect as in the instance before noted, as the parts are so arranged that either for a compression or expansion of the spring to which this absorber is attached, the friction is produced by the pressure in the pneumatic tube, 23, and which tube is to be engaged by the inner face of the conical or tapering heads of Fig. 1, the single cam-groove of Fig. 5 may be employed without departing from the spirit of my invention.

In Fig. 6 I omit the threads on the friction blocks and in the casing and in this instance there is a constant friction between the blocks, 34, and the casing, 35, depending upon the pressure in the pneumatic tube. In other words, there is constant pressure at all times between the inner and outer casing, no matter in what position the pivoted arms may be.

In brief, when using the construction shown in Figs. 3 and 4, there is an increased frictional resistance as the arms separate, but no increased frictional resistance when the arms are compressed. When using the device of Fig. 5, there is an increased frictional resistance when the arms separate and an increased frictional resistance when the arms are compressed. With the device of Fig. 6, there is no increased frictional resistance, whether the arms are separated or forced together.

The operations of the devices shown in Figs. 5 and 6 are essentially as given for the like parts of the other figures and it will be understood by those skilled in the art without more detailed explanation.

Having thus described my invention what I claim as new and desire to secure by Letters Patent is:—

1. A shock absorber comprising a pair of arms; a casing on the inner end of one of said arms and having oppositely projecting tapering portions; oppositely projecting tapering blocks or heads on the inner end of the other arm and embraced by said casing; means between the adjacent tapering surfaces of the blocks and casing for causing relative transverse movement between the casing and blocks, and an elastic cushion interposed between the inner opposed faces of the blocks and engaged by the transverse movement of the blocks toward each other to retard the movement of the arms beyond a neutral position with a gradually increasing resistance.

2. A shock absorber comprising a pair of arms; a casing on the inner end of one of said arms, and having an oppositely-projecting tapering interior; oppositely-projecting tapering blocks on the other arm adapted to register with and to be inclosed by said casing; right-and-left threaded connections between the blocks and the interior of the oppositely-extending portions of the casing whereby the blocks transversely approach and recede in unison relatively to the casing; and an elastic cushion interposed between the inner opposed faces of the blocks adapted to retard the movement of the arms beyond a neutral position with a gradually increasing resistance.

3. A shock absorber comprising a pair of arms; a casing on the inner end of one of said arms and having oppositely projecting tapering portions; oppositely projecting tapering blocks or heads on the inner end of the other arm and embraced by said casing; means between the adjacent tapering surfaces of the blocks and casing for causing relative transverse movement between the casing and blocks, an elastic cushion interposed between the inner opposed faces of the blocks and engaged by the transverse movement of the blocks toward each other to retard the movement of the arms beyond a neutral position with a gradually increasing resistance; and means for inflating said cushion.

4. A shock absorber comprising a pair of arms; a casing on the inner end of one of said arms, and having an oppositely-projecting tapering interior; oppositely-projecting tapering blocks on the other arm adapted to register with and to be inclosed by said casing; right-and-left threaded connections between the blocks and the interior of the oppositely-extending portions of the casing whereby the blocks transversely approach and recede in unison relatively to the casing; an elastic cushion interposed between the inner opposed faces of the blocks adapted to retard the movement of the arms beyond a neutral position with a gradually increasing resistance, and means for inflating said cushion.

5. A shock-absorber comprising a pair of arms; a casing on the inner end of one of said arms and having oppositely projecting tapering portions; oppositely projecting tapering blocks or heads on the inner end of the other arm and embraced by said casing; means between the adjacent tapering surfaces of the blocks and casing for causing relative transverse movement between the casing and blocks; and an elastic cushion interposed between the inner opposed faces of the blocks and engaged by the transverse movement of the blocks toward each other to retard the movement of the arms beyond a neutral position with a gradually increasing resistance; and an open-ended sleeve within which the cushion is contained, said blocks having annular grooves for receiving the ends of the sleeve and thereby permitting the blocks to move transversely toward and from each other.

6. A shock absorber comprising a pair of arms; a casing on the inner end of one of said arms and having oppositely projecting tapering portions; oppositely projecting tapering blocks or heads on the inner end of the other arm and embraced by said casing; means between the adjacent tapering surfaces of the blocks and casing for causing relative transverse movement between the casing and blocks; and an elastic cushion interposed between the inner opposed faces of the blocks and engaged by the transverse movement of the blocks toward each other to retard the movement of the arms beyond a neutral position with a gradually increasing resistance, said casing being formed of two similar parts secured together and one of said arms between divided lengthwise with each part carrying one of the tapering blocks on its inner end.

7. A shock absorber comprising a pair of arms having registering inner ends; a casing having oppositely extending portions; oppositely extending blocks in the casing, said casing being fixed to one of said arms and said blocks being fixed to the other arm; and an inflatable member between the opposed faces of said blocks and adapted to be compressed by inward movement of the blocks.

In testimony whereof I affix my signature.

JASPER A. McCASKELL.